US012757815B2

(12) United States Patent
Schoeny et al.

(10) Patent No.: US 12,757,815 B2
(45) Date of Patent: Oct. 13, 2026

(54) AGRICULTURAL CLOSING SYSTEM AND METHOD

(71) Applicant: CNH Industrial America LLC, New Holland, PA (US)

(72) Inventors: Christopher Schoeny, Minooka, IL (US); Trevor Stanhope, Oak Lawn, IL (US)

(73) Assignee: CNH Industrial America LLC, New Holland, PA (US)

( * ) Notice: Subject to any disclaimer, the term of this patent is extended or adjusted under 35 U.S.C. 154(b) by 1012 days.

(21) Appl. No.: 17/851,788

(22) Filed: Jun. 28, 2022

(65) Prior Publication Data

US 2023/0413716 A1 Dec. 28, 2023

(51) Int. Cl.

*A01C 5/06* (2006.01)
*A01B 49/06* (2006.01)
*A01B 63/00* (2006.01)
*A01C 7/20* (2006.01)

(52) U.S. Cl.

CPC .............. *A01C 5/068* (2013.01); *A01B 49/06* (2013.01); *A01B 63/008* (2013.01); *A01C 7/203* (2013.01); *A01C 7/205* (2013.01)

(58) Field of Classification Search

CPC ...................................................... A01C 5/068
See application file for complete search history.

(56) References Cited

U.S. PATENT DOCUMENTS 9,826,677 B2 11/2017 Gervais et al.
9,848,524 B2 12/2017 Sauder et al.
10,779,462 B2 * 9/2020 Gresch ................. A01B 63/008
11,122,733 B2 9/2021 Kinzenbaw et al.
11,531,317 B2 * 12/2022 Tao ....................... G06T 7/0004
11,703,404 B2 * 7/2023 McKay .................... B25J 9/023
73/862.541
11,768,187 B2 * 9/2023 Wisdom ................. G01C 21/20
56/327.1

(Continued)

OTHER PUBLICATIONS

Grisso et al., "Planter/Drill Considerations for Conservation Tillage Systems," Virginia Cooperative Extension, Virginia Tech, Virginia State University, Publication 442-457 (10 pages) https://vtechworks.lib.vt.edu/bitstream/handle/10919/56032/442-457.pdf?sequence= 1 &isAllowed=y.

*Primary Examiner* — Jean Paul Cass
(74) *Attorney, Agent, or Firm* — Dority & Manning, P.A.

(57) ABSTRACT

A system for a row unit of a planting implement includes a frame. A closing system is operably coupled with the frame. The closing system includes a closing arm operably coupled to the frame on a first portion of the closing arm, a closing disc operably coupled with a second portion of the closing arm, and an adjustment assembly operably coupled with the closing arm, the adjustment assembly configured to alter one or more operating parameters of the closing system. The system further includes a positioning system and a computing system communicatively coupled to the closing system and the positioning system. The computing system is configured to determine a location of the closing system based on data received from the positioning system, and alter the one or more operating parameters of the closing system from a first operating parameter to a second operating parameter based on the location of the closing system.

18 Claims, 7 Drawing Sheets

(56) References Cited

U.S. PATENT DOCUMENTS

| | | | | |
|---|---|---|---|---|
| 12,004,451 | B2 * | 6/2024 | Jeanty | A01D 46/30 |
| 2016/0338260 | A1 * | 11/2016 | Hahn | A01C 5/068 |
| 2018/0128933 | A1 * | 5/2018 | Koch | A01C 7/205 |
| 2019/0373797 | A1 | 12/2019 | Schoeny et al. | |
| 2020/0022301 | A1 * | 1/2020 | Ritland | A01C 7/206 |
| 2021/0007266 | A1 | 1/2021 | Stoller et al. | |
| 2021/0037695 | A1 | 2/2021 | Strnad et al. | |
| 2021/0084810 | A1 | 3/2021 | Falasz | |
| 2021/0315145 | A1 | 10/2021 | Bassett | |
| 2022/0078972 | A1 * | 3/2022 | Faulring | B25J 15/0226 |
| 2022/0369539 | A1 * | 11/2022 | Frank | A01C 7/205 |
| 2023/0263088 | A1 * | 8/2023 | Koch | A01C 5/068 172/4 |
| 2024/0393107 | A1 * | 11/2024 | Kise | A01B 63/111 |

* cited by examiner

PM

AGRICULTURAL CLOSING SYSTEM AND METHOD

FIELD

The present disclosure generally relates to planting implements and, more particularly, to a closing system for a row unit of a planting implement.

BACKGROUND

Planting implements may be employed to deposit an agricultural product, such as a seed, fertilizer, pesticide, and other chemicals and materials, into soil. In some cases, the planting implements can include one or more furrow-forming tools or openers that excavate a furrow or trench in the soil. One or more deposition systems of the planting implements may, in turn, deposit the agricultural product into the furrow. After deposition of the agricultural product, a closing system may close the furrow in the soil, such as by pushing the excavated soil into the furrow. While such closing systems can work well, an improved closing system having adjustment features for a planting implement would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a system for a row unit of a planting implement. The system includes a frame. A closing system is operably coupled with the frame. The closing system comprises a closing arm operably coupled to the frame on a first portion of the closing arm, a closing disc operably coupled with a second portion of the closing arm, and an adjustment assembly operably coupled with the closing arm. The adjustment assembly is configured to alter one or more operating parameters of the closing system. The system further includes a positioning system and a computing system communicatively coupled to the closing system and the positioning system. The computing system is configured to determine a location of the closing system based on data received from the positioning system and alter the one or more operating parameters of the closing system from a first operating parameter to a second operating parameter based on the location of the closing system.

In some aspects, the present subject matter is directed to a method for an agricultural operation. The method includes determining, based on data from a positioning system, a location of a first row unit. The method also includes comparing, with a computing system, the first location of the first row unit to a prescription map. The method further includes altering, with an adjustment assembly operably coupled with the computing system, an operating parameter of a closing system of the first row unit when the location of the first row unit is moved from a first operating parameter zone to a second operating parameter zone. The first operating parameter zone and the second operating parameter zone may each be defined by a prescription map.

In some aspects, the present subject matter is directed to a system for a planting implement. The system includes a first row unit including a first closing system, a second row unit including a second closing system, and a positioning system. A computing system is communicatively coupled to the first closing system, second closing system, and the positioning system. The computing system is configured to determine a location of the first row unit relative to the positioning system, determine a location of the second row unit relative to the positioning system, and determine a first operating parameter for the first closing system based on the location of the first row unit and a second operating parameter for the second closing system based on the location of the second row unit, wherein the first operating parameter is varied from the second operating parameter.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
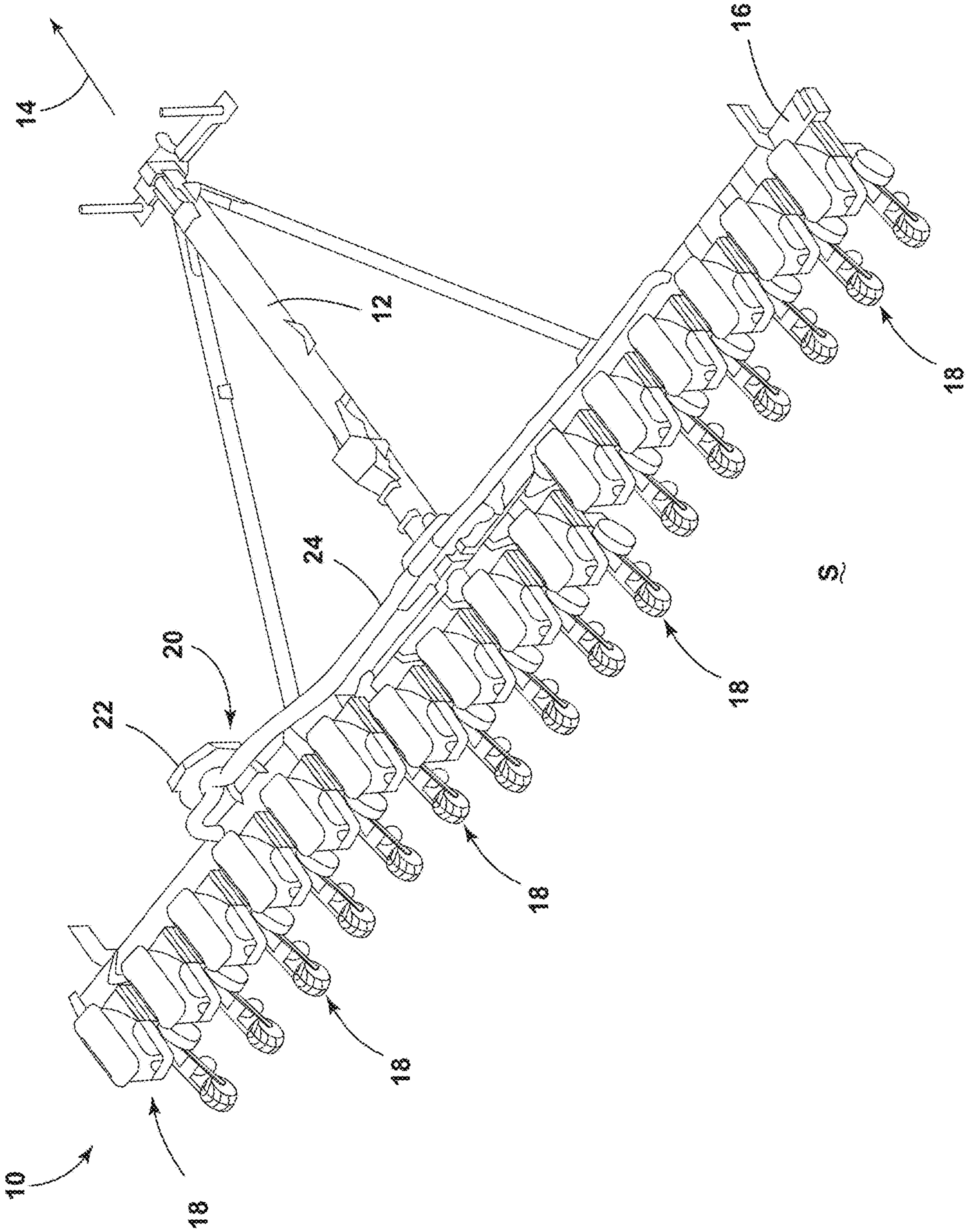
FIG. 1 illustrates a perspective view of a planting implement in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a material within a fluid circuit. For example, "upstream" refers to the direction from which a material flows, and "downstream" refers to the direction to which the material moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a system for a row unit of a planting implement that includes a frame, an opening assembly for creating a furrow within a field, a deposition system for depositing an agricultural product, such as a seed, fertilizer, pesticide, and other chemicals and materials, into soil, and a closing system for closing the furrow in the soil, such as by pushing the excavated soil into the furrow. Each of the opening assembly, the deposition system, and the closing system may be operably coupled with the frame.

In various instances, the closing system can include a closing assembly, a press assembly positioned rearward of the closing assembly, and an adjustment assembly operably coupled with at least one of the closing assembly and the press assembly. The adjustment assembly is configured to alter one or more operating parameters of the closing system, which may be accomplished by altering a position of a closing tool 48, such as one or more discs, and/or altering a position of a press tool, such as a press wheel.

The system can further include a positioning system that may be configured to determine the location of the implement and/or the row unit. A computing system can be communicatively coupled to the closing system and the positioning system. The computing system can be configured to determine a location of the closing system based on data received from the positioning system and alter the one or more operating parameters of the closing system from a first operating parameter to a second operating parameter based on the location of the closing system.

During operation, a closing system of each row unit may be altered independently of any other closing system associated with a separate row unit. By actuating the adjustment assembly based on a location of each row unit within the field, the adjustment assembly may be capable of accommodating variations in soil conditions that affect soil friability and cohesiveness.

Referring now to the drawings, FIG. 1 illustrates a perspective view of a planting implement 10 in accordance with aspects of the present subject matter. In the illustrated example, the planting implement 10 is configured as a planter. However, in alternative embodiments, the planting implement 10 may generally correspond to any suitable seed-planting equipment or implement, such as a seeder or any other seed-dispensing implement.

As shown in FIG. 1, the planting implement 10 can include a tow bar 12. In general, the tow bar 12 may be configured to couple to a tractor or other agricultural vehicle, such as via a suitable hitch assembly. In this respect, the tractor may tow the planting implement 10 across a field in a direction of travel (indicated by arrow 14) to perform a planting operation on the field.

Furthermore, the planting implement 10 can include a toolbar 16 coupled to an aft end portion of the tow bar 12. The toolbar 16 may be configured to support and/or couple to one or more components of the planting implement 10. In some examples, the toolbar 16 may be configured to support a plurality of seed-planting units or row units 18. Each row unit 18 may be configured to form a furrow having a desired depth within a soil S of a field. Thereafter, each row unit 18 may deposit an agricultural product, such as seeds and/or a fertilizer, within the corresponding furrow and subsequently closes the corresponding furrow after the agricultural product has been deposited. In general, the planting implement 10 may include any number of row units 18. For example, in the illustrated example, the planting implement 10 includes sixteen row units 18 coupled to the toolbar 16. However, in other embodiments, the planting implement 10 may include six, eight, twelve, twenty-four, thirty-two, or thirty-six row units 18.

Additionally, in some examples, the planting implement 10 can include a pneumatic distribution system 20. In general, the pneumatic distribution system 20 is configured to distribute seeds from a bulk storage tank to the individual row units 18. As such, the pneumatic distribution system 20 may include a fan 22 or other pressurized air source and a plurality of seed conduits 24 extending between the fan 22 and the row units 18. In this respect, the pressurized air generated by the fan 22 conveys the seeds from the bulk storage tank through the seed conduits 24 to the individual row units 18. However, the seeds may be provided to the row units 18 in any other suitable manner.

It will be further appreciated that the configuration of the planting implement 10 described above and shown in FIG. 1 is provided only to place the present subject matter in an exemplary field of use. Thus, it will be appreciated that the present subject matter may be readily adaptable to any agricultural implement configuration.

Figure 2:
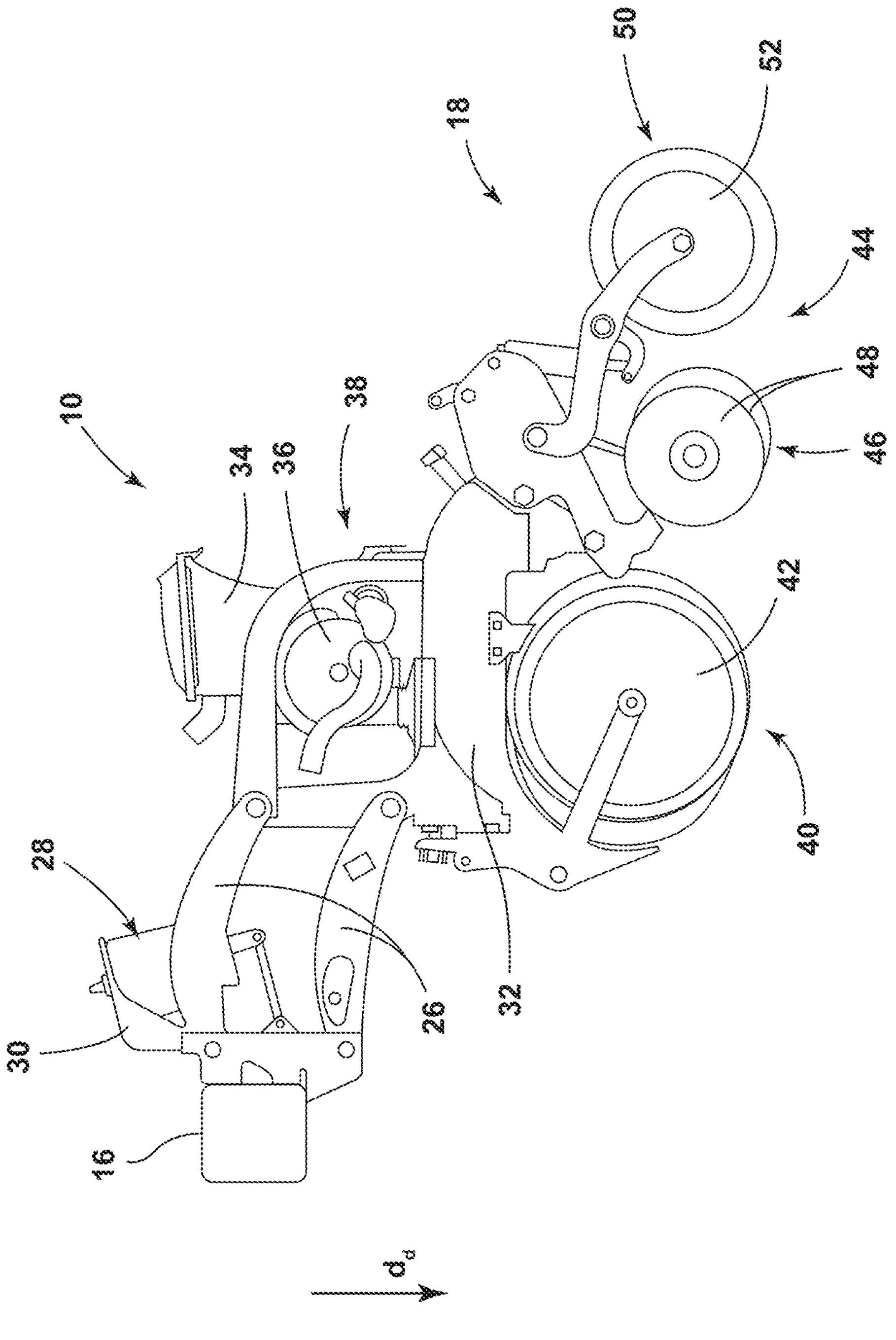
FIG. 2 illustrates a perspective view of a row unit for a planting implement in accordance with aspects of the present subject matter.

Referring now to FIG. 2, a linkage assembly 26, which may be a four-bar linkage, can be configured to couple the row unit 18 to the toolbar 16, while enabling vertical movement of the row unit 18. In addition, a down force cylinder 28 can extend between a mounting bracket 30 and a portion of the parallel linkage to establish a contact force between the row unit 18 and the soil. The down force cylinder 28 is configured to apply a force to the row unit 18 in a downward direction $d_d$, thereby driving one or more components of the row unit 18 into the soil S. As will be appreciated, a desired level of down force may vary based on soil type, the degree of tillage applied to the soil, soil moisture content, amount of residue cover, and/or tool wear, among other factors. Because such factors may vary from one side of the implement 10 to the other, a different level of down force may be selected for each row unit 18.

In the various examples, the linkage assembly 26 can be pivotally coupled to a frame 32. An agricultural product hopper 34 may be operably coupled to the frame 32. The hopper 34 is configured to hold an agricultural product, such as a seed, fertilizer, pesticide, and other chemicals and materials, for deposition by the row unit 18. In some instances, the hopper 34 may be adapted and configured to store the agricultural product and gravitationally deposit the agricultural product to a seed metering system 36 of a deposition system 38, and ultimately to the ground as the implement 10 moves over and across the field.

The frame 32 can further support a furrow opening assembly 40 near a leading end portion of the row unit 18 for cutting open a furrow to receive the deposited seeds. In various examples, the furrow opening assembly 40 can include one or more laterally spaced furrow opener discs 42. In some instances, the row unit 18 can include an opener shoe and/or a runner-type opener for providing a furrow in the ground.

A furrow closing system 44 can be positioned at the opposing end portion, which may be near a trailing end portion of the row unit 18. In various examples, the closing system 44 may include a closing assembly 46 that can include a closing tool 48, such as one or more discs 50. The closing system 44 may additionally or alternatively include a press assembly 52 that can include a press tool 54, such as a packer or press wheel 56. In operation, the closing assembly 46 can close the furrow and the press assembly 52 can tamp the furrow down.

Figure 3:
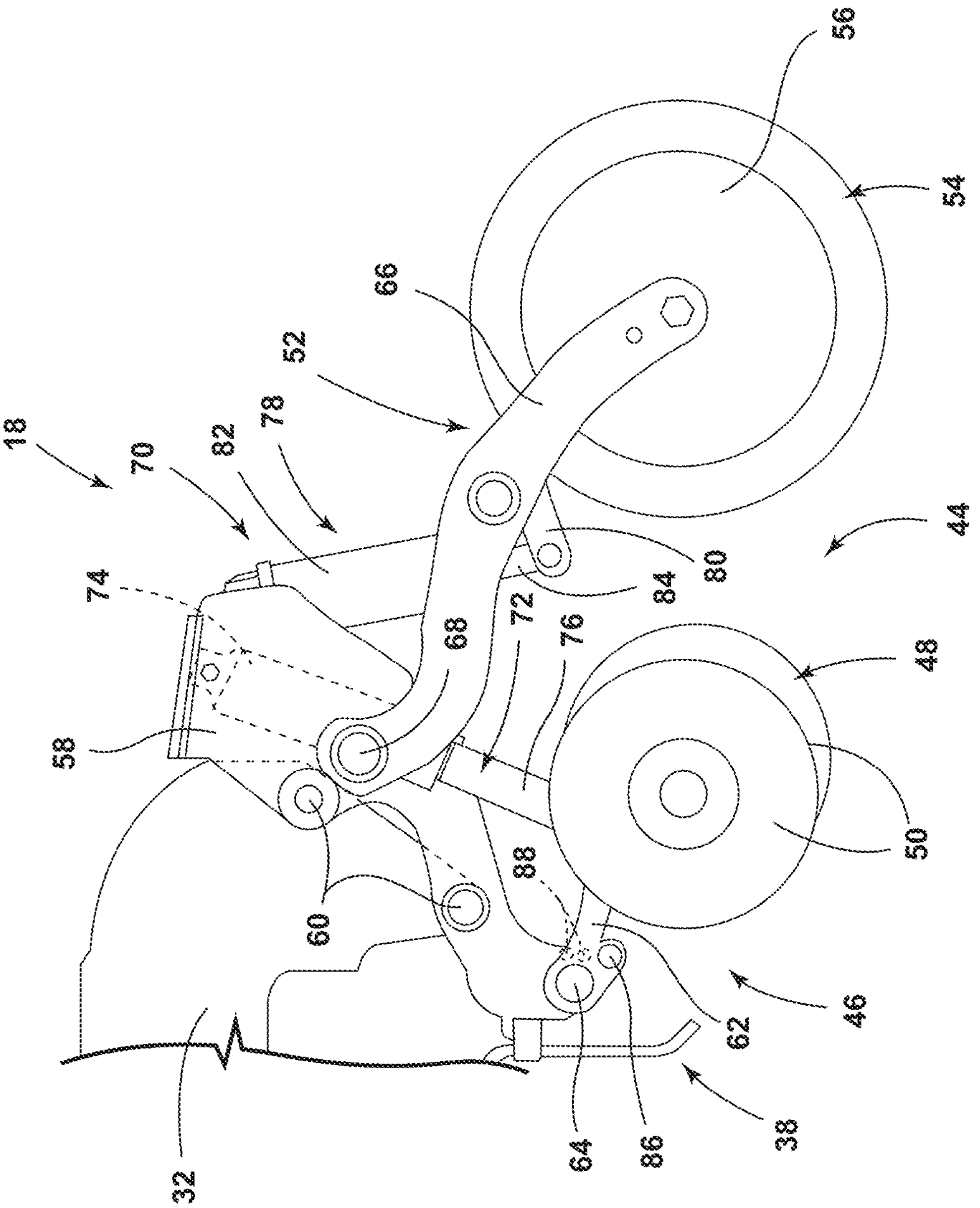
FIG. 3 illustrates a side view of a closing system for the row unit in accordance with aspects of the present subject matter.

Referring now to FIG. 3, a frame element 58 can extend from the frame 32 and operably couple with one or more components of the closing system 44. The frame element 58 may be a separate component rigidly attached to the frame 32 or may be integrally formed with the frame 32. If a separate component, the frame element 58 may rigidly attach to the frame 32, such as via a plurality of bolts 60.

In some instances, the closing assembly 46 may include a closing arm 62 that may be operably coupled to the frame 32 on a first portion thereof. For instance, the closing arm 62 may be pivotally coupled to the frame element 58 (e.g., via a closing arm pivot point 64), which is then coupled with the frame 32. The closing tool 48 may be operably coupled with a second portion of the closing arm 62.

In several examples, the press assembly 52 may include a press arm 66 that may be operably coupled to the frame 32 on a first portion thereof. For instance, the press arm 66 may be pivotally coupled to the frame element 58 (e.g., via a press arm pivot point 68), which is then coupled with the frame 32. The press tool 54 may be operably coupled with a second portion of the press arm 66.

The closing system 44 can further include an adjustment assembly 70 that may be operably coupled with the closing assembly 46 and/or the press assembly 52. For example, the adjustment assembly 70 may include a closing assembly actuator 72 operably coupled to the frame element 58 and the closing arm 62. In various examples, the closing assembly actuator 72 can include a housing 74 and an adjustment rod 76 that may be operably coupled with the frame element 58 (and/or any other component of the row unit 18) to regulate the contact force between the closing assembly 46 and the soil.

Additionally or alternatively, the adjustment assembly 70 may include a press assembly actuator 78 operably coupled to the frame element 58 and the arm, which may be operably coupled through a support 80. In various examples, the press assembly actuator 78 can include a housing 82 and an adjustment rod 84 that may be operably coupled with the frame element 58 (and/or any other component of the row unit 18) to regulate the contact force between the press assembly 52 and the soil. In operation, adjustment of the closing assembly actuator 72 may result in transferring a first down force to the closing tool 48 by pivoting the closing arm 62. Similarly, adjustment of the press assembly actuator 78 may result in transferring a second down force to the press tool 54 by pivoting the press arm 66.

The closing assembly actuator 72 may be operable to provide a first down force from the frame element 58 to the closing assembly 46 without substantially affecting the press assembly 52. Similarly, the press assembly actuator 78 may be operable to provide a second down force from the frame element 58 to the press assembly 52 without substantially affecting the closing assembly 46. Accordingly, soil closing, such as by the closing tool 48, and soil pressing, such as by the press tool 54, may act with forces independent of one another, with both reacting to the common frame element 58.

A variety of devices may be used for each of the closing assembly actuator 72 and the press assembly actuator 78. For example, the closing assembly actuator 72 and/or the press assembly actuator 78 may be configured as a motor, a cylinder, and/or any other device that may be powered electrically, hydraulicly, pneumatically, magnetically, thermally, and/or through any other manner may be used in various combinations to achieve fine-tune adjustment. For example, the closing assembly actuator 72 could include a pneumatic cylinder, while the press assembly actuator 78 may include a hydraulic cylinder disposed through a coil spring. The closing assembly actuator 72 and the press assembly actuator 78, respectively, may be manually controlled, electronically controlled, and/or part of a closed-loop system.

In some instances, a down stop 86 may be used to limit the first down force produced by the closing assembly actuator 72. The down stop 86 may include a bolt, pin, or other rigid element inserted into one of a plurality of holes corresponding to positions 88, which limits an angular range of motion of the closing assembly actuator 72 in increasing amounts. Selecting a different position 88 with the down stop 86 may allow selecting a different maximum first down force to be allowed. As a result, the down stop 86 may help the closing tool 48 from being buried if too much down force is added. With the down stop 86 in place, additional down force can be added to ensure the closing tool 48 can force a trench closed without disrupting the seed in difficult to close soils.

Figure 4:
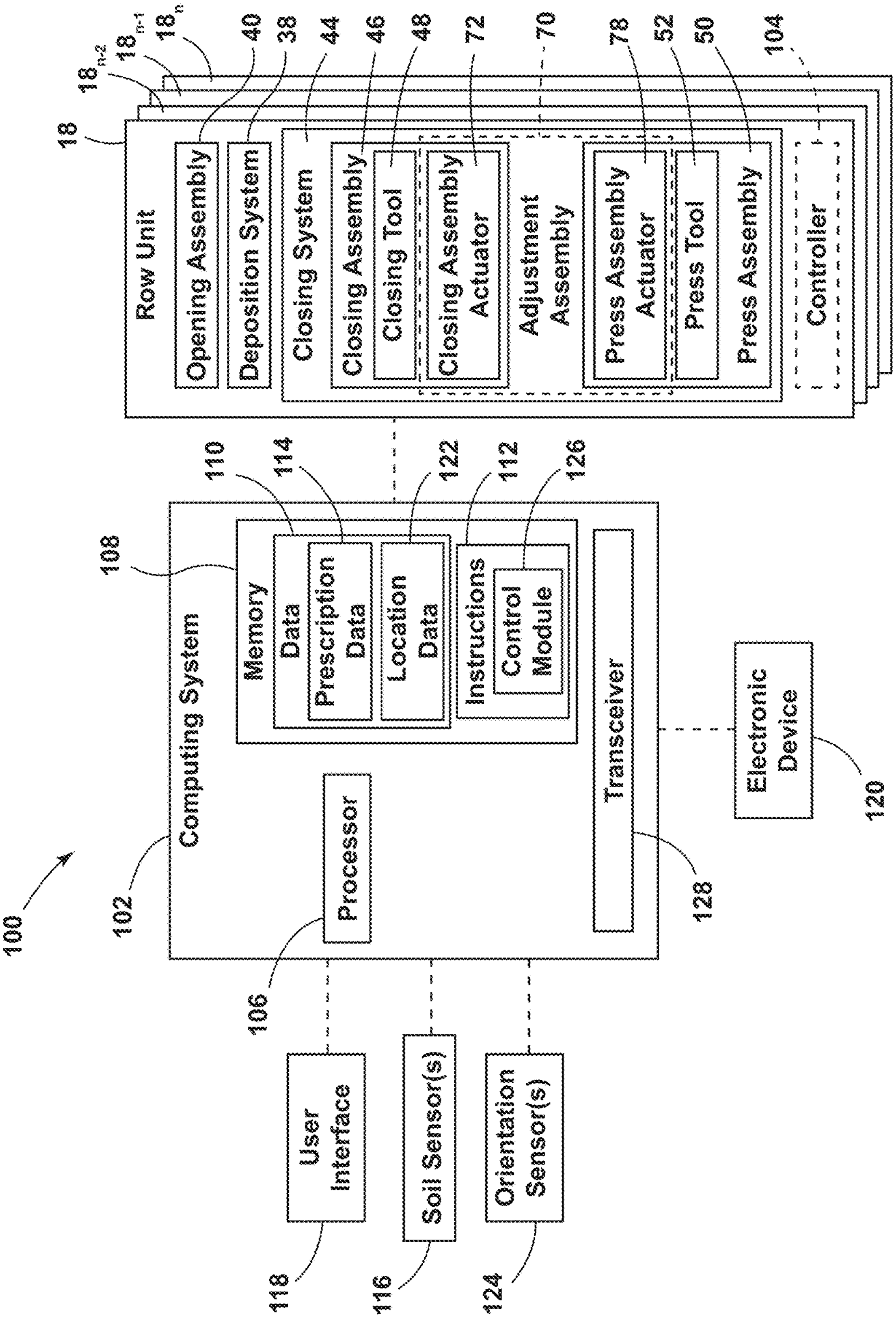
FIG. 4 illustrates a block diagram of components of a system for selectively adjusting one or more row units of a planting implement in accordance with aspects of the present subject matter.

Referring now to FIG. 4, a block view of a system 100 for operating various agricultural implements is illustrated in accordance with aspects of the present subject matter. In general, the system 100 will be described herein with reference to the planting implement 10 and the row unit 18 described above with reference to FIGS. 1-3. However, it will be appreciated that the disclosed system 100 may generally be utilized with any planter or seeder having any suitable implement configuration, with row units 18 having any suitable row unit configuration, with seed meters having any suitable meter configuration, and/or with seed transport members have any suitable transport member configuration. For purposes of illustration, communicative links, or electrical couplings of the system 100 shown in FIG. 4 are indicated by dashed lines. The one or more communicative links or interfaces may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). In various examples, the wireless communication networks can include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

In several examples, the system 100 may include a computing system 102 and various other components configured to be communicatively coupled to and/or controlled by the computing system 102, such as one or more row units 18 of the implement 10. While one row unit 18 is illustrated in FIG. 4, it will be appreciated that the planting implement 10 may include any number of row units 18, $\mathbf{18}_{n-2}$, $\mathbf{18}_{n-1}$, $\mathbf{18}_n$ without departing from the scope of the present disclosure.

The computing system 102 may be communicatively coupled to a respective adjustment assembly 70 of the one or more row units 18, $\mathbf{18}_{n-2}$, $\mathbf{18}_{n-1}$, $\mathbf{18}_n$. The computing system 102 can be configured to receive data indicative of a detected location of the closing system 44 within a field and activate the adjustment assembly (possibly through a respective controller 104 associated with each row unit 18, $\mathbf{18}_{n-2}$, $\mathbf{18}_{n-1}$, $\mathbf{18}_n$) to alter the position of the closing assembly 46 and/or the press assembly 52 of the closing system 44 relative to the frame 32 of the row unit 18. By actuating the adjustment assembly 70 based on a location of the row unit 18 within the field, the adjustment assembly 70 may be capable of accommodating variations in soil conditions that affect soil friability and cohesiveness.

In general, the computing system 102 may comprise any suitable processor-based device, such as a computing device or any suitable combination of computing devices. Thus, in several embodiments, the computing system 102 may include one or more processors 106 and associated memory 108 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 108 of the computing system 102 may generally comprise memory elements including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 108 may generally be configured to store information accessible to the processor 106, including data 110 that can be retrieved, manipulated, created, and/or stored by the processor 106 and instructions 112 that can be executed by the processor 106 and configure the computing system 102 to perform various computer-implemented functions, such as one or more algorithms and/or related methods. In addition, the computing system 102 may also include various other suitable components, such as a communications circuit or module, one or more input/output channels, a data/control bus, and/or the like.

In several embodiments, the data 110 may be stored in one or more databases. For example, the memory 108 may include a prescription database 114 for storing prescription data that may be received by one or more sensors 116 operably coupled with the implement 10 (FIG. 1), one or more sensors 116 operably coupled with the vehicle, and/or one or more sensors 116 that is remote from the vehicle and the implement (FIG. 1). Additionally or alternatively, the prescription data may be inputted through any other manner, such as manually inputting through a user interface 118, manually inputting through an electronic device 120, and/or through computer-implemented functions, such as one or more algorithms and/or related methods, and stored within the prescription database 114. The prescription data may be in the form of a prescription map, one or more look-up tables, and/or any other form without departing from the teachings provided herein.

The memory may also include location database 122, which may be configured to store data from a positioning system 124 associated with the implement (FIG. 1) (and/or the row unit 18). In some examples, the positioning system 124 may be configured to determine the location of the implement 10 (FIG. 1), and/or the row unit 18 by using a satellite navigation positioning system (e.g. a global positioning system (GPS), a Galileo positioning system, the Global Navigation satellite system (GLONASS), the BeiDou Satellite Navigation and Positioning system, a dead reckoning device, and/or any other practicable device). In such embodiments, the location determined by the positioning system 124 may be transmitted to the computing system 102 (e.g., in the form of location coordinates) and stored within the location database 122 for subsequent processing and/or analysis. In some instances, the location database 122 may also store a position of each row unit 18, $\mathbf{18}_{n-2}$, $\mathbf{18}_{n-1}$, $\mathbf{18}_{n}$ relative to the positioning system 124. Based on an offset position of the positioning system 124 relative to each row unit 18, $\mathbf{18}_{n-2}$, $\mathbf{18}_{n-1}$, $\mathbf{18}_{n}$, a location of each row unit 18, $\mathbf{18}_{n-2}$, $\mathbf{18}_{n-1}$, $\mathbf{18}_{n}$ may be determined by the computing system 102 and/or the controller 104.

During operation of the system 100, the instructions 112 stored within the memory 108 of the computing system 102 may be executed by the processor(s) 106 to implement a control module 126. In general, the control module 126 may be configured to monitor and/or evaluate the data from the location data and correlate the location data to the prescription database 114. The prescription data may divide a field into two or more operating parameter zones, with each operating parameter zone specifying operating parameters for the closing system 44 in the area of the field encompassed by such zone. For instance, each operating parameter zone may specify operating parameters of the closing system 44, such as a target pressure range, a target pressure threshold, a target depth range, a target depth threshold, an aggressiveness range, an aggressiveness threshold, and/or any other controllable parameter. In turn, the closing system 44 may determine one or more operating characteristics of the closing assembly 46 and/or the press assembly 52 to operate within the operating parameters.

Additionally or alternatively, each operating parameter zone may specify operating characteristics of the closing assembly 46, such as a target pressure range of the closing tool 48, a target pressure threshold of the closing tool 48, a target depth range of the closing tool 48, a target depth threshold of the closing tool 48, an aggressiveness range of the closing tool 48, an aggressiveness threshold of the closing tool 48, and/or any other controllable parameter of the closing tool 48, which may be based on the defined prescription data.

In some instances, the control module 126 may monitor any or all of the characteristics of the closing assembly 46 and alter a position of the closing tool 48 through activation of the closing assembly actuator 72 of the adjustment assembly 70, which may alter an amount of down force provided on the soil by the closing tool 48. Further, the control module 126 may additionally or alternatively alter a position of the closing tool 48 through activation of the closing assembly actuator 72 of the adjustment assembly 70 when the row unit 18 transitions from a first operating parameter zone to a second operating parameter zone.

Still further, each operating parameter zone may additionally or alternatively specify operating characteristics of the press assembly 52, such as a target pressure range of the press tool 54, a target pressure threshold of the press tool 54, a target depth range of the press tool 54, a target depth threshold of the press tool 54, an aggressiveness range of the press tool 54, an aggressiveness threshold of the press tool 54, and/or any other controllable parameter of the press tool 54, which may be based on the defined prescription data.

In some instances, the control module 126 may monitor any or all of the characteristics of the press assembly 52 and alter a position of the press tool 54 through activation of the press assembly actuator 78 of the adjustment assembly 70, which may alter an amount of down force provided on the soil by the press tool 54. Further, the control module 126 may additionally or alternatively alter a position of the press tool 54 through activation of the press assembly actuator 78 of the adjustment assembly 70 when the row unit 18 transitions from a first operating parameter zone to a second operating parameter zone.

In various examples, the system 100 may allow for closed-loop control of one or more row units 18, $\mathbf{18}_{n-2}$, $\mathbf{18}_{n-1}$, $\mathbf{18}_{n}$ by the control module 126. Additionally or alternatively, the system 100 may allow for closed-loop control of each row unit 18, $\mathbf{18}_{n-2}$, $\mathbf{18}_{n-1}$, $\mathbf{18}_{n}$ by a controller 104 of each row unit 18, $\mathbf{18}_{n-2}$, $\mathbf{18}_{n-1}$, $\mathbf{18}_{n}$ based on the operating parameters for the closing systems 44, the operating characteristics of the closing assembly 46, and/or the operating characteristics of the press assembly 52 of each row unit 18, $\mathbf{18}_{n-2}$, $\mathbf{18}_{n-1}$, $\mathbf{18}_{n}$. In various examples, the system 100 may implement machine learning engine methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the computing system 102 and/or each controller 104 and may be used to generate a predictive evaluation of the alterations to the adjustment assembly 70. For instance, the control module 126 may alter the closing assembly actuator 72. In turn, the one or more sensors 116 may monitor the resulting down force for the closing tool 48. Each change may be fed back into the control module 126 and/or the controller 104 for each row unit 18, $\mathbf{18}_{n-2}$, $\mathbf{18}_{n-1}$, $\mathbf{18}_{n}$ for further alterations to the closing assembly actuator 72. Similarly, the control module 126 may alter the press assembly actuator 78. In turn, the one or more sensors 116 may monitor the resulting down force for the press tool 54. Each change may be fed back into the control module 126 and/or the controller 104 for each row unit 18, $\mathbf{18}_{n-2}$, $\mathbf{18}_{n-1}$, $\mathbf{18}_{n}$ for further alterations to the press assembly actuator 78.

Moreover, as shown in FIG. 4, the computing system 102 may also include a transceiver 128 to communicate via wired and/or wireless communication with any of the various other system components described herein. For instance, the user interface 118 may be in communication with the computing system 102 through the transceiver 128. In some cases, the user interface 118 may be configured to provide feedback (e.g., notifications associated with the operational parameters of each row unit 18) to the operator of the planting implement 10 (FIG. 1). As such, the user interface 118 may include one or more feedback devices, such as display screens, speakers, warning lights, and/or any other practicable device, which are configured to communicate such feedback. In addition, some examples of the user interface 118 may include one or more input devices, such as touchscreens, keypads, touchpads, knobs, buttons, sliders, switches, mice, microphones, and/or any other practicable device, which are configured to receive user inputs, which may be related to the prescription data, the operating parameters of the closing system 44, the operating characteristics of the closing assembly 46, the operating characteristics of the press assembly 52, a location of each row unit 18 relative to the positioning system 124, and/or any other information. In various examples, the user interface 118 may be positioned within a cab of a work vehicle configured to tow the planting implement 10 (FIG. 1) across the field. However, in alternative embodiments, the user interface 118 may have any suitable configuration and/or be positioned in any other suitable location.

Further, the computing system 102 may also communicate via wired and/or wireless communication with the remote electronic device 120 through the transceiver 128. The electronic device 120 may include a display for displaying information to a user. For instance, the electronic device 120 may display one or more user interfaces and may be capable of receiving remote user inputs, which may be related to the prescription data, the operating parameters of the closing system 44, the operating characteristics of the closing assembly 46, the operating characteristics of the press assembly 52, a position of each row unit 18 relative to the positioning system 124, and/or any other information. In addition, the electronic device 120 may provide feedback information, such as visual, audible, and tactile alerts, and/or allow the user to provide one or more inputs through the usage of the remote electronic device 120. It will be appreciated that the electronic device 120 may be any one of a variety of computing devices and may include a processor and memory. For example, the electronic device 120 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

It will be appreciated that, in general, the computing system 102 of the disclosed system 100 may correspond to any suitable computing device(s) that can be configured to function as described herein. In several embodiments, the computing system 102 may form part of an active planting system configured to perform a planting operation, such as by corresponding to a vehicle controller of a work vehicle configured to tow an associated planting implement 10 (FIG. 1) and/or an associated implement controller of the planting implement 10 (FIG. 1). Alternatively, the computing system 102 may comprise a separate computing device(s) configured to be used primarily for the purpose of performing the various calibration methods and/or routines described herein.

It will additionally be appreciated that the computing system 102 may correspond to an existing controller of the planting implement 10 (FIG. 1) or an associated work vehicle or the computing system 102 may correspond to a separate processing device. For instance, in some cases, the computing system 102 may form all or part of a separate plug-in module that may be installed within the planting implement 10 (FIG. 1) or associated work vehicle to allow for the disclosed system and method to be implemented without requiring additional software to be uploaded onto existing control devices of the planting implement 10 (FIG. 1) or the associated work vehicle.

Figure 5:
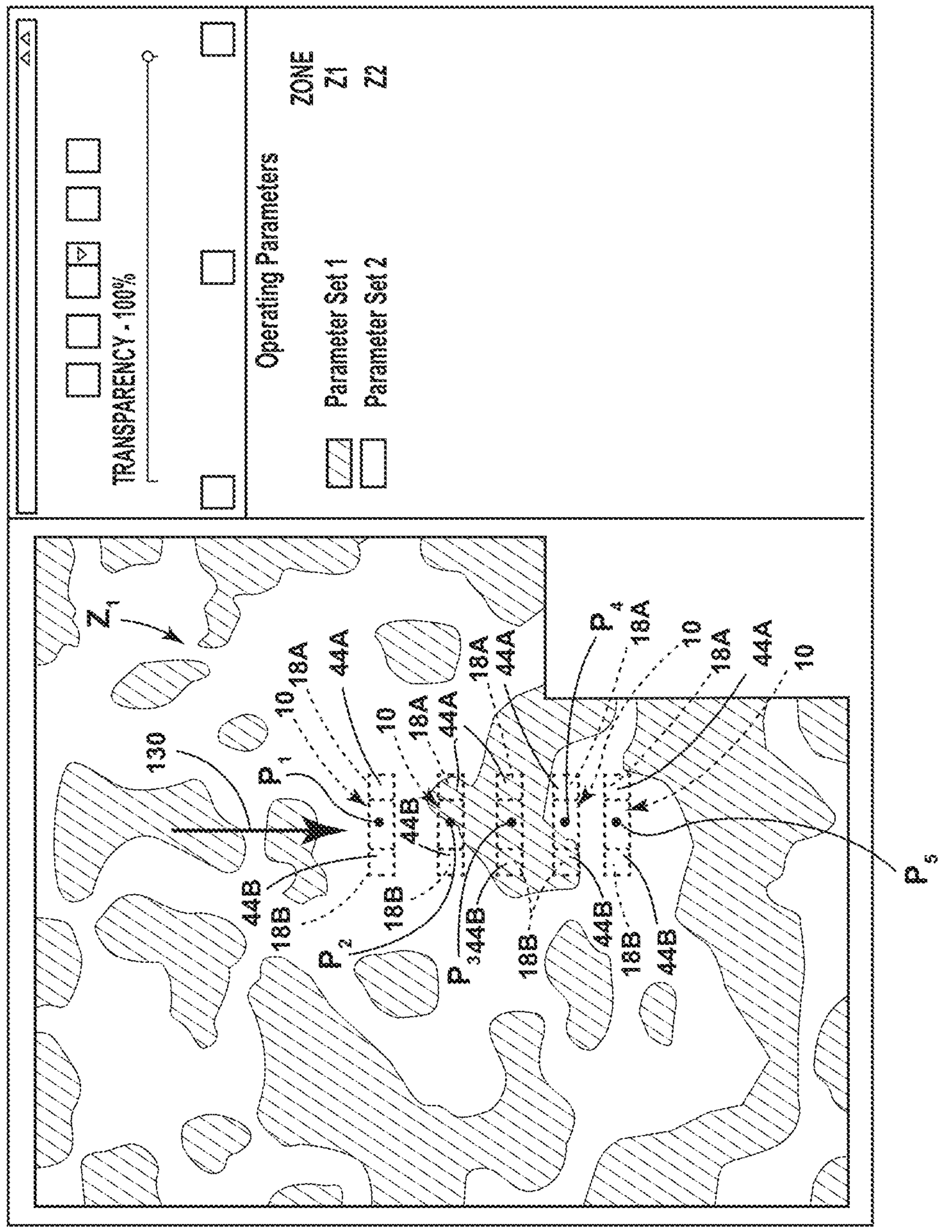
FIG. 5 illustrates an example view of a prescription map in accordance with aspects of the present subject matter.
Figure 6:
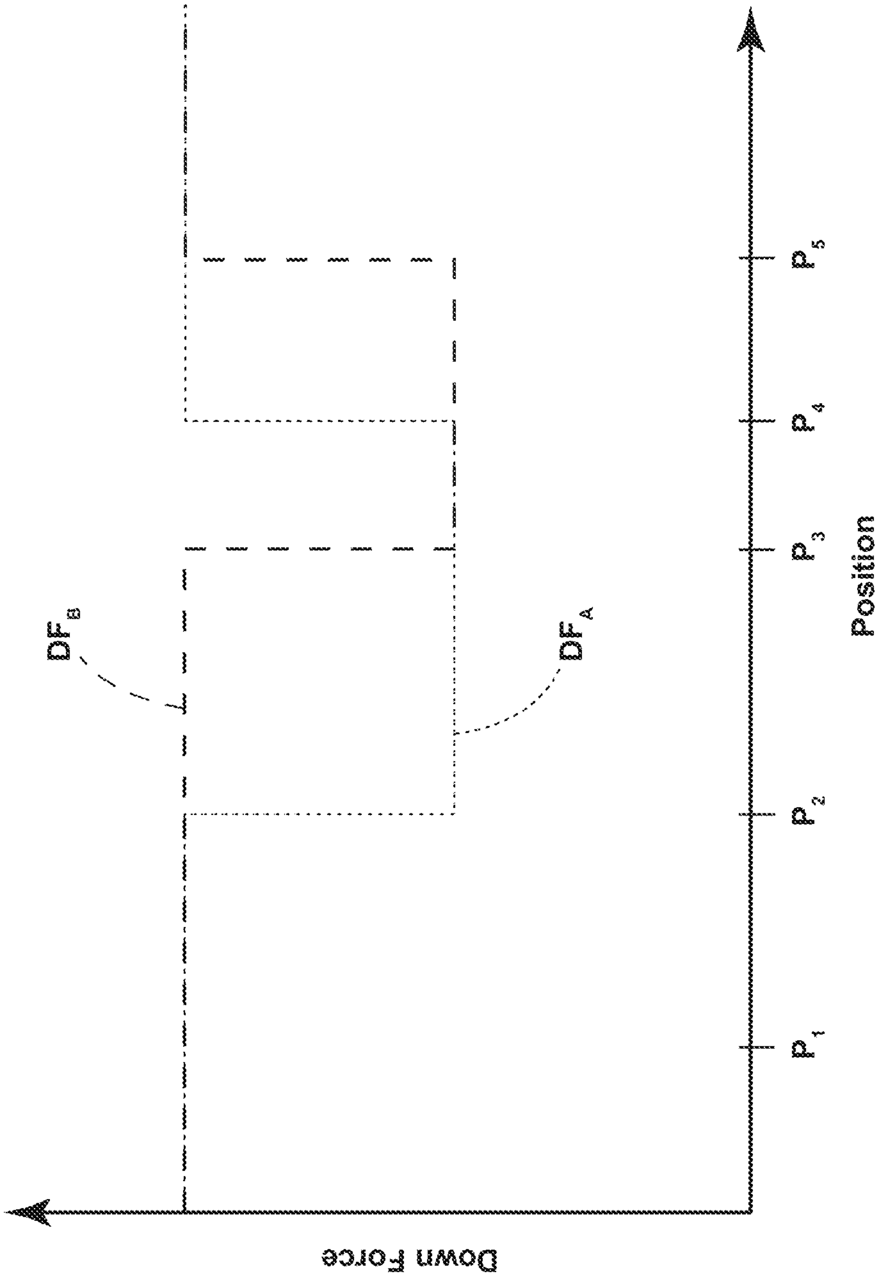
FIG. 6 illustrates a graph of down force versus time during operation of first and second row units of the implement in accordance with aspects of the present subject matter.

Referring now to FIGS. 5 and 6, an example prescription map (PM) and a graph of a down force $DF_A$ of a first closing system 44A and a down force $DF_B$ of a second closing system as an implement 10 moves from a first location $P_1$ to a fifth location $P_5$ are respectively illustrated in accordance with various aspects of the present disclosure. As shown, the prescription map PM identifies the location of operating parameter zones, such as a first operating parameter zone Z1 and a second operating parameter zone Z2 in the agricultural field. Each operating parameter zone Z1, Z2 is associated with operating parameters of the closing assembly 46, which may be based on various conditions, such as soil type, previous tillage operations, amount of residue, type of agricultural product being deposited, and/or any other factor. As shown in FIG. 5, a first operating parameter is shown as being acceptable for use in the first operating parameter zones Z1. Similarly, a second operating parameter is shown as being acceptable for use in the second operating parameter zones Z2.

With further reference to FIGS. 5 and 6, a first closing system 44A may be associated with a first row unit 18A, and a second closing system may be associated with a second row unit 18B. As provided herein, the first closing system 44A may apply a varied amount of down force relative to the second closing system as the implement moves through the field, which may occur in a direction illustrated by arrow 130 in FIG. 5. For example, when in a first location $P_1$ within the field, the first closing system 44A and the second closing system may both be within the first operating parameter zone Z1 and provided a generally similar amount of down force $DF_A$, $DF_B$ through the respective first and second closing systems 44A, 44B.

When in a second location $P_2$, the first row unit 18A may be positioned within the second operating parameter zone Z2 while the second row unit 18B is within the first operating parameter zone Z1. As such, the down force $DF_A$ of the first closing system 44A may be altered to an amount that is less than the down force $DF_B$ of the second closing system.

When in a third location $P_3$, the first row unit 18A and the second row unit 18B may both be positioned within the second operating parameter zone Z2. As such, the down force $DF_B$ of the second closing system may be altered to an amount that is generally similar to the down force $DF_A$ of the first closing system 44A.

When in a fourth location $P_4$, the first row unit 18A may be positioned within the first operating parameter zone Z1 while the second row unit 18B is within the second operating parameter zone. As such, the down force $DF_A$ of the first closing system 44A may be altered to an amount that is greater than the down force $DF_B$ of the second closing system.

When in a fifth location $P_5$, the first row unit 18A and the second row unit 18B may both be positioned within the first operating parameter zone Z1. As such, the down force $DF_B$ of the second closing system may be altered to an amount that is generally similar to the down force $DF_A$ of the first closing system 44A.

As such, each of the first closing system 44A and the second closing system may be altered independently of one another based on a location of the first row unit 18A and the second row unit 18B within the field. While the example of FIGS. 5 and 6 illustrates altering a down force of the closing system 44A, 44B of each respective row unit 18A, 18B, it will be appreciated that any other operating parameters of each of the closing systems 44A, 44B, an operating characteristic of each of the closing assemblies 46, and/or an operating characteristic of each of the press assemblies may be altered in a similar manner without departing from the scope of the present disclosure.

Figure 7:
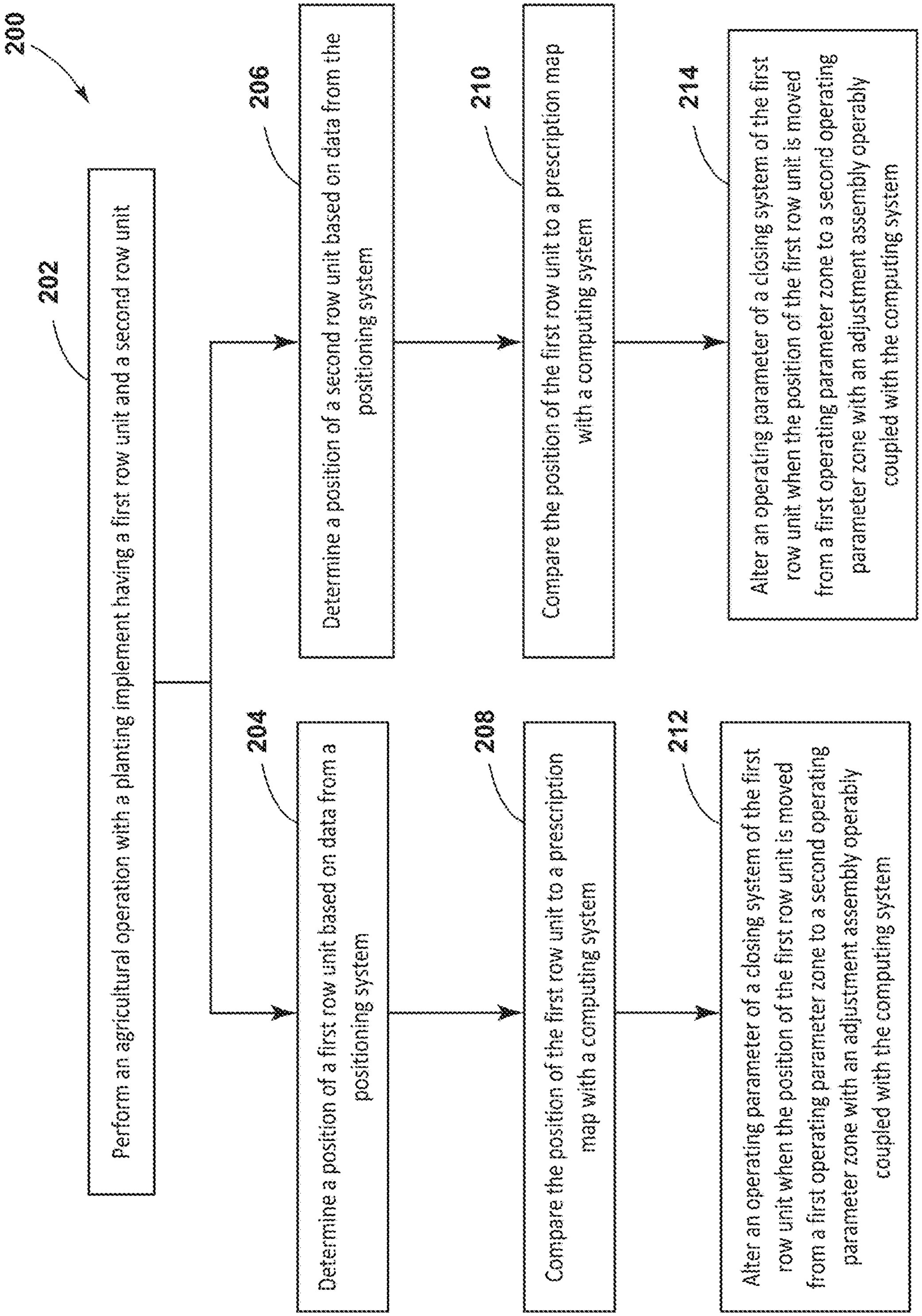
FIG. 7 illustrates a flow diagram of a method for an agricultural operation in accordance with aspects of the present subject matter.

Referring now to FIG. 7, a flow diagram of some examples of a method 200 for an agricultural operation is illustrated in accordance with aspects of the present subject matter. In general, the method 200 will be described herein with reference to the planting implement 10 and one or more row units 18 described above with reference to FIGS. 1-6. However, the disclosed method 200 may generally be utilized with any suitable vehicle and/or implement. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As illustrated in FIG. 7, at (202), the method 200 can include performing an agricultural operation with a planting implement having a first row unit and a second row unit. Each row unit may be configured to form a furrow having a desired depth within the soil of a field. Thereafter, each row unit may deposit an agricultural product, such as seeds and/or a fertilizer, within the corresponding furrow and subsequently closes the corresponding furrow after the agricultural product has been deposited with a closing system. The closing system may include a closing assembly, which may include one or more closing discs, and/or a press assembly, which may include a press tool. In addition, the closing system may include an adjustment assembly that is configured to alter one or more operating parameters of the closing system.

In general, the planting implement may include any number of row units. As such, while the described method can include a first row unit and a second row unit, the planting implement may include any number of row units without departing from the teachings provided herein.

At (204), the method 200 can include determining a location of a first row unit based on data from a positioning system. Similarly, at (206), the method 200 can include determining a location of a second row unit based on data from the positioning system. As provided herein, the positioning system may be operable coupled with each row unit, the implement, and/or the work vehicle. In instances in which the positioning system is remote from the row unit, a computing system may store a position of each row unit relative to the positioning system. Based on an offset position of the positioning system relative to each row unit, the location of each row unit may be determined.

At (208), the method 200 can include comparing the location of the first row unit to a prescription map with the computing system. Likewise, at (210), the method 200 can include comparing the location of the second row unit to a prescription map with the computing system.

At (212), the method 200 can include altering an operating parameter of a closing system of the first row unit when the location of the first row unit is moved from a first operating parameter zone to a second operating parameter zone with an adjustment assembly operably coupled with the computing system. The first operating parameter zone and the second operating parameter zone may each be defined by a prescription map.

In various examples, the zones may specify operating parameters for the first closing system in the area of the field encompassed by such zone. For instance, each operating parameter zone may specify operating parameters of the first closing system, such as a target pressure range of the first closing system, a target pressure threshold of the first closing system, a target depth range of the first closing system, a target depth threshold of the first closing system, an aggressiveness range of the first closing system, an aggressiveness threshold of the first closing system, and/or any other controllable parameter of the first closing system. In turn, the closing system may determine one or more operating characteristics of a closing assembly and/or a press assembly to operate within the operating parameters of the first closing system. For example, altering the operating parameter of the closing system can further include activating a closing assembly actuator of the adjustment assembly to alter a position of a closing disc relative to a frame of the first row unit and/or altering an operating characteristic of the first closing assembly. Additionally or alternatively, altering the operating parameter of the closing system can further include activating a press assembly actuator of the adjustment assembly to alter a position of a press wheel relative to a frame of the first row unit and/or altering the operating parameter of the closing system further includes altering an operating characteristic of the press assembly.

At (214), the method 200 can include altering an operating parameter of a closing system of the second row unit when the location of the second row unit is moved from a first operating parameter zone to a second operating parameter zone with the adjustment assembly operably coupled with the computing system. The first operating parameter zone and the second operating parameter zone may each be defined by a prescription map. In some instances, the first operating parameter and/or the second operating parameter of the closing system of the first row unit may be varied from the first operating parameter and/or the second operating parameter of the closing system of the second row unit.

In various examples, the zones may specify operating parameters for the second closing system in the area of the field encompassed by such zone. For instance, each operating parameter zone may specify operating parameters of the second closing system, such as a target pressure range of the second closing system, a target pressure threshold of the second closing system, a target depth range of the second closing system, a target depth threshold of the second closing system, an aggressiveness range of the second closing system, an aggressiveness threshold of the second closing system, and/or any other controllable parameter of the second closing system. In turn, the closing system may determine one or more operating characteristics of a closing assembly and/or a press assembly to operate within the operating parameters of the second closing system. For example, altering the operating parameter of the closing system can further include activating a closing assembly actuator of the adjustment assembly to alter a position of a closing disc relative to a frame of the second row unit and/or altering an operating characteristic of the second closing assembly. Additionally or alternatively, altering the operating parameter of the closing system can further include activating a press assembly actuator of the adjustment assembly to alter a position of a press wheel relative to a frame of the second row unit and/or altering the operating parameter of the closing system further includes altering an operating characteristic of the press assembly.

In various examples, the method 200 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the position of the ground engaging tool and/or any other component of the residue manager assembly. In some instances, the vehicle learning engine may allow for changes to the position of the ground engaging tool and/or any other component of the residue manager assembly to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term “software code” or “code” used herein refers to any instructions or set of instructions that influence the operation of a computer or controller. They may exist in a computer-executable form, such as vehicle code, which is the set of instructions and data directly executed by a computer’s central processing unit or by a controller, or a human-understandable form, such as source code, which may be compiled in order to be executed by a computer’s central processing unit or by a controller, or an intermediate form, such as object code, which is produced by a compiler. As used herein, the term “software code” or “code” also includes any human-understandable computer instructions or set of instructions, e.g., a script, that may be executed on the fly with the aid of an interpreter executed by a computer’s central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for a row unit of a planting implement, the system comprising:

a frame;

a closing system operably coupled with the frame, the closing system comprising:

a closing arm operably coupled to the frame on a first portion of the closing arm;

a closing disc operably coupled with a second portion of the closing arm; and an adjustment assembly operably coupled with the closing arm, the adjustment assembly configured to alter one or more operating parameters of the closing system;

a press arm operably coupled to the frame on a first portion of the press arm;

a press wheel operably coupled with a second end portion of the press arm, the press wheel downstream of the closing disc in a forward direction of travel;

a press assembly actuator operably coupled with the frame and the press arm, wherein the press assembly actuator is configured to alter a position of the press wheel relative to the frame, wherein soil closing from the closing disc and soil pressing from the press wheel are configured to act with forces independent of one another on a soil within a common closing system;

a positioning system; and a computing system communicatively coupled to the closing system and the positioning system, the computing system being configured to:

determine a location of the closing system based on data received from the positioning system; and alter the one or more operating parameters of the closing system from a first operating parameter to a second operating parameter based on the location of the closing system.

2. The system of claim 1, wherein the first operating parameter is a first amount of down force and the second operating parameter is a second amount of down force, the second amount varied from the first amount.

3. The system of claim 1, further comprising:

a user interface operably coupled with the computing system, wherein the one or more operating parameters is received through the user interface.

4. The system of claim 1, further comprising:

a closing assembly actuator operably coupled with the frame and the closing arm, wherein the closing assembly actuator is configured to alter a position of the closing disc relative to the frame.

5. The system of claim 4, wherein the computing system is configured to alter one or more operating characteristics of the closing assembly to alter the one or more operating parameters of the closing system from the first operating parameter to the second operating parameter based on the location of the closing system.

6. The system of claim 1, further comprising:

a press assembly, wherein the computing system is configured to alter one or more operating characteristics of the press assembly from the first operating parameter to the second operating parameter based on the location of the closing system.

7. The system of claim 1, wherein the positioning system is located remote from the frame, and wherein the computing system is configured to determine the location of the closing system based on the data received from the positioning system and an offset position of the positioning system relative to the frame.

8. The system of claim 1, wherein the first operating parameter is defined by a first operating parameter zone of a prescription map and the second operating parameter is defined by a second operating parameter zone of the prescription map.

9. A method for an agricultural operation, the method comprising:

selecting a position of a down stop of a closing disc assembly along a closing disc arm to define a maximum down force of the closing disc assembly, the stop defining a plurality of positions on the closing disc arm via a plurality of holes configured to receive a pin to physically limit an angular range of motion of the closing disc arm;

determining, based on data from a positioning system, a location of a first row unit;

comparing, with a computing system, the first location of the first row unit to a prescription map; and altering, with an adjustment assembly operably coupled with the computing system, an operating parameter of a closing system of the first row unit when the location of the first row unit is moved from a first operating parameter zone to a second operating parameter zone, the first operating parameter zone and the second operating parameter zone defined by a prescription map.

10. The method of claim 9, wherein the closing system of the first row unit includes a closing assembly, and wherein altering the operating parameter of the closing system further includes activating a closing assembly actuator of the adjustment assembly to alter a position of a closing disc relative to a frame of the first row unit.

11. The method of claim 9, wherein the closing system of the first row unit includes a press assembly, and wherein altering the operating parameter of the closing system further includes activating a press assembly actuator of the adjustment assembly to alter a position of a press wheel relative to a frame of the first row unit.

12. The method of claim 9, further comprising:

determining, based on data from the positioning system, a location of a second row unit;

comparing, with a computing system, the location of the second row unit to the prescription map; and altering, with the adjustment assembly operably coupled with the computing system, the operating parameter of a closing system of the second row unit when the location of the second row unit is moved from the first operating parameter zone to the second operating parameter zone, wherein the operating parameter of the closing system of the first row unit is varied from the operating parameter of the closing system of the second row unit.

13. The method of claim 12, wherein the closing system of the second row unit includes a closing assembly, and wherein altering the operating parameter of the closing system further includes altering an operating characteristic of the closing assembly.

14. The method of claim 12, wherein the closing system of the first row unit includes a press assembly, and wherein altering the operating parameter of the closing system further includes altering an operating characteristic of the press assembly.

15. A system for a planting implement, the system comprising:

a first row unit including a first closing system;

a second row unit including a second closing system;

a positioning system; and a computing system communicatively coupled to the first closing system, the second closing system, and the positioning system, the computing system being configured to:

determine a location of the first row unit relative to the positioning system;

determine a location of the second row unit relative to the positioning system; and compare the location of the first row unit and the location of the second row unit to a prescription map having a plurality of operating parameter zones and determine a first operating parameter for the first closing system based on the location of the first row unit within a first zone of the prescription map and a second operating parameter for the second closing system based on the location of the second row unit within a second zone of the prescription map, wherein the first operating parameter is varied from the second operating parameter during simultaneous use of the first row unit and the second row unit, wherein the first operating parameter is selectively varied through a first adjustment assembly, and wherein the first adjustment assembly includes a closing assembly actuator operably coupled with a closing assembly and a press assembly actuator operably coupled with a press assembly.

16. The system of claim 15, wherein the second operating parameter is selectively varied through a second adjustment assembly, and wherein the second adjustment assembly includes a closing assembly actuator operably coupled with a closing assembly and a press assembly actuator operably coupled with a press assembly.

17. The system of claim 15, wherein the first operating parameter is based on a combination of one or more operating characteristics of the closing assembly of the first row unit and one or more operating characteristics of the press assembly of the first row unit.

18. The system of claim 15, wherein the first operating parameter is an amount of down force generated by the closing system.

* * * * *